（12） United States Patent
Curran et al.

(10) Patent No.: US 7,537,018 B1
(45) Date of Patent: May 26, 2009

(54) METHOD AND APPARATUS FOR CONTROLLING PARTIAL VAPOR PRESSURE IN A SORPTION ANALYZER

(75) Inventors: Brian Curran, West Grove, PA (US); Eric Pilacek, East Norriton, PA (US)

(73) Assignee: Waters Investments Limited, New Castle, DE (US)

( * ) Notice: Subject to any disclaimer, the term of this patent is extended or adjusted under 35 U.S.C. 154(b) by 417 days.

(21) Appl. No.: 11/415,092

(22) Filed: May 2, 2006

Related U.S. Application Data

(60) Provisional application No. 60/676,939, filed on May 3, 2005.

(51) Int. Cl.
*G05D 11/02* (2006.01)
(52) U.S. Cl. ............... 137/3; 137/89; 137/93; 137/597
(58) Field of Classification Search ........... 137/14, 137/597, 89, 93, 3–7; 73/64.56; 261/104, 261/121.1
See application file for complete search history.

(56) References Cited

U.S. PATENT DOCUMENTS

| | | | | |
|---|---|---|---|---|
| RE35,018 E | * | 8/1995 | Homan | 137/597 |
| 5,456,025 A | * | 10/1995 | Joiner et al. | 73/29.01 |
| 5,648,605 A | * | 7/1997 | Takahashi | 73/197 |
| 6,469,780 B1 | * | 10/2002 | McDermott et al. | 356/37 |
| 2001/0051376 A1 | * | 12/2001 | Jonker | 436/37 |

* cited by examiner

*Primary Examiner*—Stephen M Hepperle
(74) *Attorney, Agent, or Firm*—Aslan Baghdadi; Paul, Hastings, Janofsky & Walker LLP

(57) ABSTRACT

An embodiment of the present invention is a method for creating and maintaining a partial vapor pressure in a sample chamber of a sorption analyzer. A first dry gas flow is purged from a first mass flow controller through a saturator to produce a near-saturated gas flow. The near-saturated gas flow is mixed with a second dry gas flow from a second mass flow controller to produce a mixed gas flow with a predetermined partial vapor pressure. The mixed gas flow is directed into the sample chamber. If the lowest possible vapor pressure is required in the sample chamber, the first dry gas flow is directed around the saturator to the sample chamber and vapor migrating from the saturator is vented to the atmosphere.

20 Claims, 3 Drawing Sheets

METHOD AND APPARATUS FOR CONTROLLING PARTIAL VAPOR PRESSURE IN A SORPTION ANALYZER

CROSS-REFERENCE TO RELATED APPLICATION

This application claims the benefit of U.S. Provisional Patent Application Ser. No. 60/676,939 filed May 3, 2005, which is herein incorporated by reference in its entirety.

BACKGROUND OF THE INVENTION

1. Field of the Invention

Embodiments of the present invention relate to a method and apparatus for controlling vapor pressure in a sorption analyzer. More particularly, embodiments of the present invention relate to a method and apparatus for controlling and maintaining the atmosphere surrounding samples undergoing sorption analysis to a very low partial vapor pressure.

2. Background Information

A sorption analyzer is an instrument that can create and maintain a desired atmosphere within a chamber and measure a property of a sample placed in the chamber. For example, the partial vapor pressure within a chamber can be created and maintained for the purpose of studying a sample's tendency to absorb or desorb a vapor. Vapors can include but are not limited to water vapor or vapor from an organic solvent.

The weight of a sample is one property that can be measured by a sorption analyzer. The amount of absorption or desorption of a vapor by a sample can be determined by weighing the sample at various partial vapor pressures, for example. One type of sorption analyzer utilizes a microbalance in the chamber of the sorption analyzer for weighing the sample. A sorption analyzer that determines the absorption or desorption of a vapor by a sample by measuring the weight of the sample performs gravimetric sorption analysis.

A sorption analyzer can also create and maintain the temperature within a chamber. A thermogravimetrical analyzer (TGA) is an instrument generally used to measure the decomposition of a sample as a function of temperature. A TGA heats a sample and measures the weight gain or loss during the process. TGAs are described, for example, in U.S. Pat. No. 5,165,792, which is incorporated by reference herein. TGAs can be adapted to provide gravimetrical sorption analysis or thermogravimetrical sorption analysis. A humidity-controlled chamber used in conjunction with a TGA to provide sorption analysis is described, for example, in U.S. patent application Ser. No. 10/910,575 filed Aug. 4, 2004, which is incorporated by reference herein.

Some hygroscopic materials require extremely low partial vapor pressures to completely dry prior to sorption analysis. For example, microcrystalline cellulose (MCC) BCR RM 302 requires an extremely low partial vapor pressure of water to completely dry prior to performing sorption analysis according to the European cost 90 method. In view of the foregoing, it can be appreciated that a substantial need exists for methods and apparatus that can control and maintain the atmosphere surrounding samples undergoing sorption analysis to a very low partial vapor pressure.

BRIEF SUMMARY OF THE INVENTION

The present invention provides the lowest possible vapor pressure that can be produced by an apparatus used to create and maintain a partial vapor pressure in a sample chamber of a sorption analyzer. The lowest possible vapor pressure is provided by venting near-saturated gas used to produce a partial vapor pressure before the near-saturated gas reaches the sample chamber of the sorption analyzer.

One embodiment of the present invention is an apparatus for creating and maintaining a partial vapor pressure in a sample chamber of a sorption analyzer. This apparatus includes a first mass flow controller, a saturator, a second mass flow controller, a two-way valve, and a three-way valve. The first mass flow controller provides a first dry gas flow. The saturator saturates the first dry gas flow into a near-saturated gas flow. An output of the saturator is in fluid communication with an input of the sample chamber. The second mass flow controller provides a second dry gas flow. The two-way valve is in fluid communication at an input end of the two-way valve with the outside atmosphere. The three-way valve includes an input port in fluid communication with an output of the first mass flow controller, a first output port in fluid communication with an input of the saturator, and a second output port in fluid communication with the input of the sample chamber and the output of the saturator, an output of the second mass flow controller, and an output end of the two-way valve.

Another embodiment of the present invention is a method for creating and maintaining a partial vapor pressure in a sample chamber of a sorption analyzer. A first dry gas flow is purged from a first mass flow controller through a saturator to produce a near-saturated gas flow. The near-saturated gas flow is mixed with a second dry gas flow from a second mass flow controller to produce a mixed gas flow with a predetermined partial vapor pressure. The mixed gas flow is directed into the sample chamber. If the lowest possible vapor pressure is required in the sample chamber, the first dry gas flow is directed around the saturator to the sample chamber and vapor migrating from the saturator is vented to the atmosphere.

Figure 1:
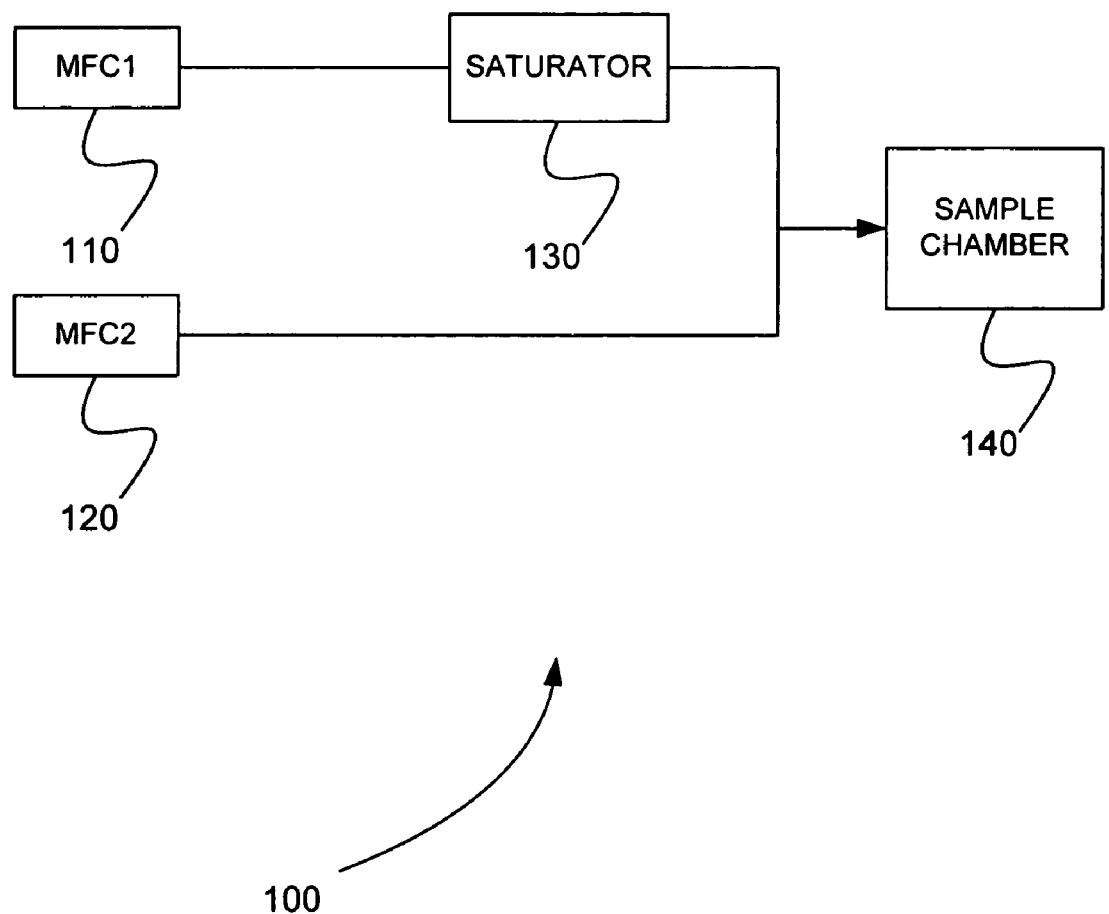
FIG. 1 is a schematic diagram of a two mass flow controller system for creating and maintaining a desired partial vapor pressure in a sample chamber of a sorption analyzer, in accordance with an embodiment of the present invention.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

FIG. 1 is a schematic diagram of a two mass flow controller system 100 for creating and maintaining a desired partial vapor pressure in a sample chamber 140 of a sorption analyzer, in accordance with an embodiment of the present invention. Mass flow controller (MFC) 110 purges dry gas through saturator 130 to create a near-saturated gas flow. The near-saturated gas flow from saturator 130 is created by bubbling the gas from MFC 110 through a volatile material or by purging the gas from MFC 110 through moist wicking material immersed in a bath of the volatile material, for example.

The volatile material can be, but is not limited to, an organic liquid (e.g., alcohol or ether) or water. MFC 120 purges dry gas directly.

The near-saturated gas flow from saturator 130 and the gas flow from MFC 120 are mixed according to predetermined proportions before reaching sample chamber 140. The near-saturated gas flow from saturator 130 and the gas flow from MFC 120 are mixed by varying the amount of dry gas produced by MFC 110 and MFC 120, respectively. The mixture of near-saturated gas flow from saturator 130 and the gas flow from MFC 120 enters sample chamber 140 and creates the predetermined partial vapor pressure in sample chamber 140.

In system 100, the lowest possible partial vapor pressure is provided by producing no dry gas from MFC 110 and all of the dry gas supplied to sample chamber 140 from MFC 120. Even under this condition, however, vapor molecules from the output of saturator 130 can diffuse into the dry gas flow from MFC 120.

Figure 2:
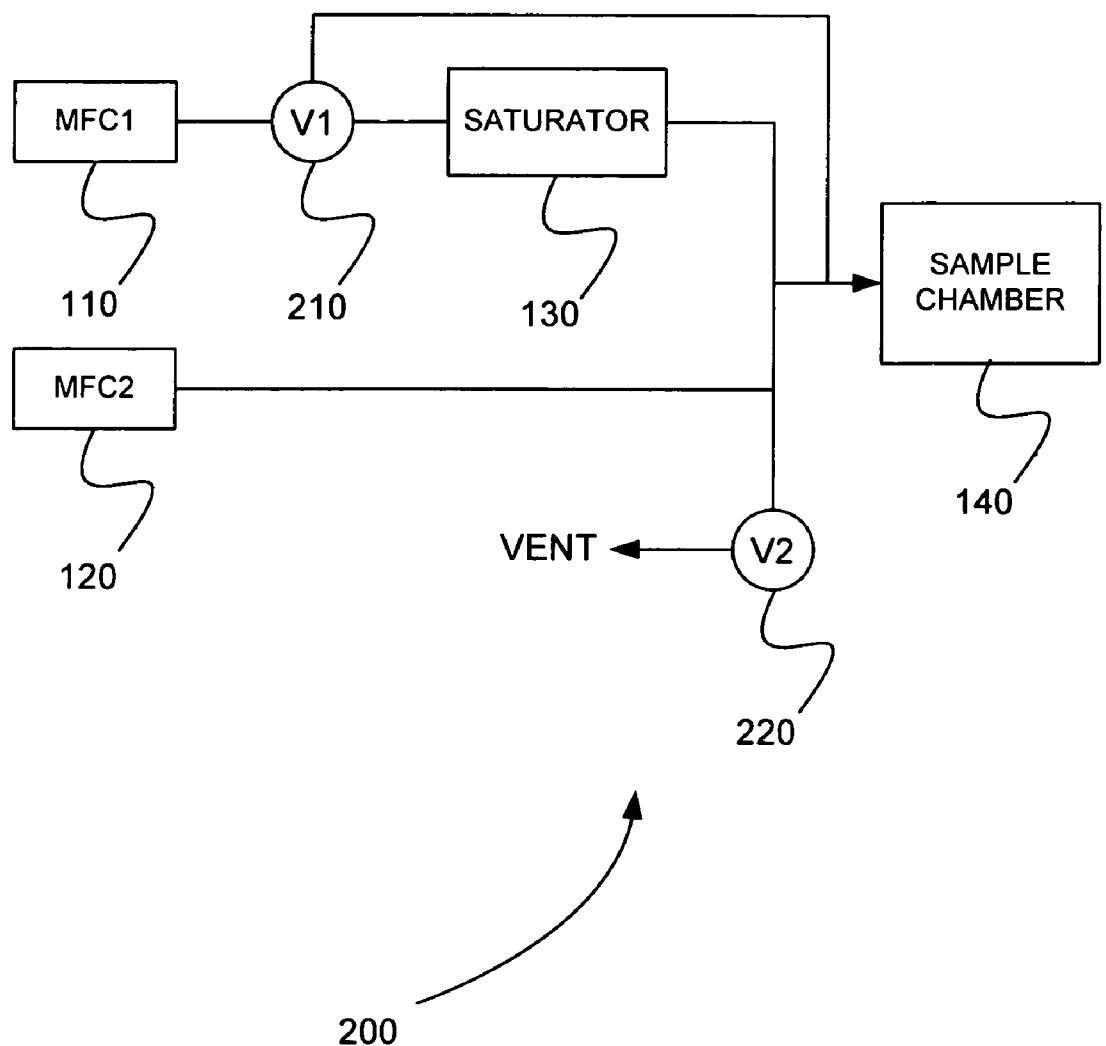
FIG. 2 is a schematic diagram of a two mass flow controller system for creating and maintaining a desired partial vapor pressure in a sample chamber of a sorption analyzer utilizing two valves, in accordance with an embodiment of the present invention.

FIG. 2 is a schematic diagram of a two mass flow controller system 200 for creating and maintaining a desired partial vapor pressure in a sample chamber 140 of a sorption analyzer utilizing two valves, in accordance with an embodiment of the present invention. In system 200, two valves are used to redirect or divert the flow of dry gas from MFC 110 around saturator 130 and to create a backward flow of dry gas from MFC 110 and away from sample chamber 140 to minimize the amount of vapor that diffuses into sample chamber 140.

Valve 210 is a three-way valve having one input port and two alternative output ports. Valve 210 is a solenoid valve, for example. The input port of valve 210 is connected to the output of MFC 110. The first output port of valve 210 is connected to the input of saturator 130. The second output port of valve 210 is connected between the input of sample chamber 140 and the output of saturator 130, the output of MFC 120, and valve 220. During normal operation of system 200, valve 210 opens the path from the input port to the first output port and closes the path from the input port to the second output port. During normal operation, therefore, valve 210 directs all of the dry gas flow from MFC 110 through saturator 130 to create a near-saturated gas flow from saturator 130. This is the same flow of gas from MFC 110 that takes place in system 100.

For the purpose of introducing dry gas only into sample chamber 140, however, valve 210 opens the path from the input port to the second output port and closes the path from the input port to the first output port valve 210. Opening the path from the input port to the second output port of valve 210 directs all of the dry gas flow from MFC 110 around saturator 130 and to the connection between the input of sample chamber 140 and the output of saturator 130, the output of MFC 120, and valve 220.

Valve 220 is a two-way valve. Valve 220 is a solenoid valve, for example. During normal operation of system 200, valve 220 is closed allowing the dry gas flow from MFC 120 to mix with the near-saturated gas flow from saturator 130. This is the same process that occurs in system 100.

At substantially the same time that valve 210 directs all of the dry gas flow from MFC 110 around saturator 130, MFC 120 is turned off and valve 220 is opened to allow gas to vent to the atmosphere. Vapor molecules that diffuse from the outlet of saturator 130 are carried away from sample chamber 140 and vented out to the atmosphere through valve 220. The opening of valve 220 also causes the backward flow of a portion of the dry gas from MFC 110 away from sample chamber 140 and out to the atmosphere through valve 220, further minimizing the amount of vapor that migrates from saturator 130 to sample chamber 140.

Note that the opening of valve 220 must reduce the pressure in the direction of valve 220 enough to cause the vapor from saturator 130 to be vented and a portion of the dry gas from MFC 110 to flow in the direction of valve 220. The opening of valve 220 cannot, however, reduce the pressure in the direction of valve 220 so that the predetermined amount of dry gas flow from MFC 110 does not flow into sample chamber 140.

Figure 3:
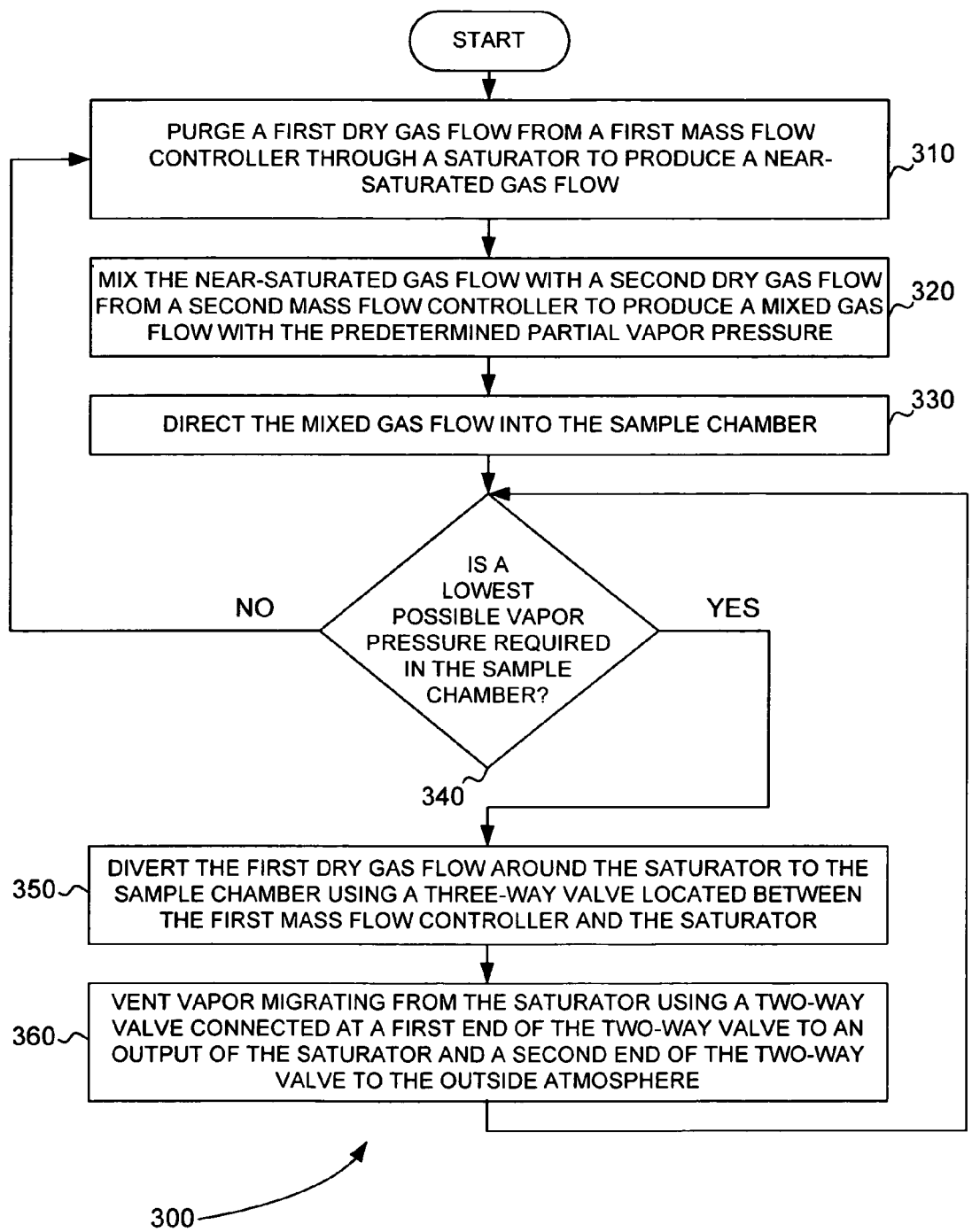
FIG. 3 is a flowchart showing a method for creating and maintaining a partial vapor pressure in a sample chamber of a sorption analyzer, in accordance with an embodiment of the present invention.

FIG. 3 is a flowchart showing a method 300 for creating and maintaining a partial vapor pressure in a sample chamber of a sorption analyzer, in accordance with an embodiment of the present invention.

In step 310 of method 300, a first dry gas flow from a first mass flow controller is purged through a saturator to produce a near-saturated gas flow.

In step 320, the near-saturated gas flow is mixed with a second dry gas flow from a second mass flow controller to produce a mixed gas flow with the predetermined partial vapor pressure.

In step 330, the mixed gas flow is directed into the sample chamber.

In step 340, it is determined if the lowest possible vapor pressure is required in the sample chamber. If the lowest possible vapor pressure is required in the sample chamber, step 350 is executed. If the lowest possible vapor pressure is not required in the sample chamber the method returns to step 310.

In step 350, the first dry gas flow is directed around the saturator to the sample chamber using a three-way valve located between the first mass flow controller and the saturator.

In step 360, vapor migrating from the saturator is vented using a two-way valve connected at a first input end of the two-way valve to an output of the saturator and a second output end of the two-way valve to the outside atmosphere.

In accordance with an embodiment of the present invention, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed. The terms "instructions configured to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Systems and methods in accordance with an embodiment of the present invention disclosed herein can advantageously improve sorption analysis by drying the sample chamber of the sorption analyzer using gas with a very low partial vapor pressure.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. An apparatus for creating and maintaining a partial vapor pressure in a sample chamber of a sorption analyzer, comprising:
a first mass flow controller providing a first dry gas flow;
a saturator configured to saturate the first dry gas flow into a near-saturated gas flow, an output of the saturator in fluid communication with an input of the sample chamber;
a second mass flow controller providing a second dry gas flow;
a two-way valve in fluid communication at an output end of the two-way valve with an outside atmosphere; and
a three-way valve comprising an input port in fluid communication with an output of the first mass flow controller, a first output port in fluid communication with an input of the saturator, and a second output port in fluid communication with the input of the sample chamber and the output of the saturator, an output of the second mass flow controller, and an input end of the two-way valve, wherein, in a first mode of operation, the first dry gas flow provided from the first mass flow controller is configured to pass through the three-way valve before entering the saturator.

2. The apparatus of claim 1, wherein the first mass flow controller is configured to purge a first dry gas through the saturator creating the near-saturated gas flow, the near-saturated gas flow and the second dry gas are combined to produce a mixed gas flow with a predetermined partial vapor pressure, and the mixed gas flow is directed into the sample chamber.

3. The apparatus of claim 1, wherein, in a second mode of operation, the three way valve is configured to divert the first dry gas flow around the saturator to the sample chamber and the two-way valve is configured to vent vapor migrating from the saturator to an outside atmosphere through the output end of the two-way valve.

4. The apparatus of claim 1, wherein the two-way valve is configured to vent the second output port, the output of the saturator, and the output of the second mass flow controller.

5. The apparatus of claim 1, wherein the two-way valve and the three-way valve are solenoid valves.

6. The apparatus of claim 3, wherein, in the second mode of operation, the second mass flow controller is configured to turn off.

7. The apparatus of claim 1, wherein the saturator is configured to saturate the first dry gas flow using one of water and an organic liquid.

8. A method for creating and maintaining a partial vapor pressure in a sample chamber of a sorption analyzer, comprising:
purging a first dry gas flow from a first mass flow controller through a saturator to produce a near-saturated gas flow;
mixing the near-saturated gas flow with a second dry gas flow from a second mass flow controller to produce a mixed gas flow with a predetermined partial vapor pressure;
directing the mixed gas flow into the sample chamber; and
if a lowest possible vapor pressure is required in the sample chamber,
diverting the first dry gas flow around the saturator to the sample chamber and
venting vapor migrating from the saturator.

9. The method of claim 8, wherein diverting the first dry gas flow around the saturator to the sample chamber comprises using a three-way valve located between the first mass flow controller and the saturator.

10. The method of claim 8, wherein venting vapor migrating from the saturator comprises using a two-way valve connected at an input end of the two-way valve to an output of the saturator and an output end of the two-way valve to an outside atmosphere.

11. The method of claim 10, further comprising if a lowest possible vapor pressure is required in the sample chamber, connecting the first dry gas flow between an input to the sample chamber and the output of the saturator and the input end of the two-way valve so that a portion of the dry gas flow flows away from the sample chamber.

12. The method of claim 8, further comprising if a lowest possible vapor pressure is required in the sample chamber, turning off the second mass flow controller.

13. The method of claim 8, wherein the two-way valve and the three-way valve are solenoid valves.

14. The method of claim 8, wherein purging a first dry gas flow from a first mass flow controller through a saturator comprises using one of water and an organic liquid.

15. The method of claim 8, wherein purging a first dry gas flow from a first mass flow controller through a saturator to produce a near-saturated gas flow comprises one of bubbling the first dray gas flow through a volatile material and purging the first dry gas flow through moist wicking material immersed in a bath of the volatile material.

16. The method of claim 15, wherein the volatile material is one of water and an organic material.

17. An apparatus for controlling a partial vapor pressure in a sample chamber of a sorption analyzer, wherein the apparatus is configured to provide a gas flow to the sample chamber in a first and second mode of operation, the apparatus comprising:
a first mass flow controller whose outlet is configured to provide a first dry gas flow;
a three way valve having an input port in fluid communication with the outlet of the first mass flow controller;
a saturator having an input in fluid communication with a first output port of the three-way valve, and having an output in fluid communication with an input of the sample chamber;
a second mass flow controller configured to provide a second dry gas flow and being in fluid communication with the input of the sample chamber; and
a two-way valve in fluid communication at its output end with an outside atmosphere and at its input end with the output of the saturator,
wherein, in the first mode of operation:
the first and second mass flow controllers are configured to provide a first and a second dry gas flow, respectively, and
the three-way valve is configured to receive the first dry gas flow through its input port and to discharge the dry gas flow through the first output port;
wherein, in the second mode of operation:
the first mass flow controller is configured to provide a first dry gas flow,
the first output port of the three-way valve is closed,
the three-way valve is configured to receive the first dry gas flow through its input port and to discharge the dry gas flow through a second output port that is in fluid communication with the sample chamber through a line that bypasses the input port of the saturator, and the second mass flow controller is closed.

18. The apparatus of claim 17, wherein the first mass flow controller is configured to output the first dry gas through the saturator, wherein a near-saturated gas flow is discharged from the saturator, wherein the near-saturated gas flow and the second dry gas flow are combined to produce a mixed gas flow having a predetermined partial vapor pressure, and wherein the mixed gas flow is directed into the sample chamber.

19. The apparatus of claim 17, wherein, in the second mode of operation, the two-way valve is configured to vent vapor migrating from the saturator to an outside atmosphere through the output end of the two-way valve.

20. The apparatus of claim 19, wherein, in the second mode of operation, the two-way valve is configured to reduce a pressure in the direction of the two-way valve that is sufficient to vent a first portion of dry gas discharged from the second output port, and is configured to vent vapor discharged from the output of the saturator, wherein a second portion of dry gas discharged from the second output port flows into the sample chamber.

* * * * *

UNITED STATES PATENT AND TRADEMARK OFFICE
CERTIFICATE OF CORRECTION

PATENT NO.         : 7,537,018 B1
APPLICATION NO. : 11/415092
DATED              : May 26, 2009
INVENTOR(S)      : Curran et al.

It is certified that error appears in the above-identified patent and that said Letters Patent is hereby corrected as shown below:

On the Title Page at (75) replace "Eric Pilacek" with --Eric Pilacik--

Signed and Sealed this

Fifteenth Day of September, 2009

David J. Kappos
*Director of the United States Patent and Trademark Office*